US012811315B2

(12) United States Patent
Kurokawa et al.

(10) Patent No.: US 12,811,315 B2
(45) Date of Patent: Nov. 24, 2026

(54) ANTENNA APPARATUS

(71) Applicant: Panasonic Holdings Corporation, Osaka (JP)

(72) Inventors: Aya Kurokawa, Osaka (JP); Hiroyuki Tani, Hyogo (JP); Manabu Gokan, Hyogo (JP); Takuma Ikeda, Osaka (JP); Yuki Tanaka, Tokyo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 24 days.

(21) Appl. No.: 18/958,931

(22) Filed: Nov. 25, 2024

(65) Prior Publication Data

US 2025/0087904 A1 Mar. 13, 2025

Related U.S. Application Data

(63) Continuation of application No. PCT/JP2023/014083, filed on Apr. 5, 2023.

(30) Foreign Application Priority Data

Jun. 2, 2022 (JP) ................................ 2022-090204

(51) Int. Cl.
*H01Q 21/26* (2006.01)
*H01Q 5/371* (2015.01)

(52) U.S. Cl.
CPC ............. *H01Q 21/26* (2013.01); *H01Q 5/371* (2015.01)

(58) Field of Classification Search
CPC ........ H01Q 21/26; H01Q 5/371; H01Q 21/24; H01Q 9/42; H01Q 1/22; H01Q 1/243; H01Q 1/273; H01Q 5/40
See application file for complete search history.

(56) References Cited

U.S. PATENT DOCUMENTS 3,680,135 A * 7/1972 Boyer .................... H01Q 21/20 343/750
5,264,861 A * 11/1993 Roederer ............... H01Q 21/24 343/846
6,967,631 B1 * 11/2005 Park ........................ H01Q 1/36 343/702

(Continued)

FOREIGN PATENT DOCUMENTS

JP 2009-525648 A 7/2009
JP 2016-167680 A 9/2016

(Continued)

OTHER PUBLICATIONS

International Search Report dated Jun. 20, 2023 issued in International Patent Application No. PCT/JP2023/014083, with English translation.

*Primary Examiner* — Dameon E Levi
*Assistant Examiner* — Jose A. Miranda Gonzalez
(74) *Attorney, Agent, or Firm* — Rimon P.C.

(57) ABSTRACT

Provided is an antenna apparatus that includes: a first element having a flat plate shape; and a second element that includes a plate-like portion provided parallel to the first element. The plate-like portion includes three or more power feeding paths each of which radially extends from a power feeder in a central portion; and three or more antenna portions which extend from ends of the three or more power feeding paths, respectively, and each of which is connected to a grounding portion of the first element.

14 Claims, 13 Drawing Sheets

(56) References Cited

U.S. PATENT DOCUMENTS

| | | | | |
|---|---|---|---|---|
| 7,692,601 | B2 * | 4/2010 | Bisiules | H01Q 21/24 343/803 |
| 10,205,240 | B2 * | 2/2019 | McMichael | H01Q 9/0435 |
| 2005/0280599 | A1 * | 12/2005 | Le Goff | H01Q 9/42 343/895 |
| 2006/0152411 | A1 * | 7/2006 | Iguchi | H01Q 9/42 343/702 |
| 2007/0254587 | A1 * | 11/2007 | Schadler | H01Q 21/24 455/562.1 |
| 2009/0002254 | A1 * | 1/2009 | Dumon | H01Q 9/46 343/860 |
| 2009/0027294 | A1 * | 1/2009 | Bourry | H01Q 9/0421 343/848 |
| 2009/0128442 | A1 * | 5/2009 | Fujita | H01Q 5/385 343/907 |
| 2010/0053006 | A1 * | 3/2010 | Miyoshi | H01Q 9/27 343/742 |
| 2010/0073239 | A1 * | 3/2010 | Tatarnikov | H01Q 21/205 343/700 MS |
| 2010/0207836 | A1 * | 8/2010 | Cortes-Medellin | H01Q 11/10 343/792.5 |
| 2010/0277389 | A1 * | 11/2010 | Kikin | H01Q 21/24 343/843 |
| 2015/0162660 | A1 * | 6/2015 | Orsi | H01Q 9/42 343/866 |
| 2015/0263416 | A1 * | 9/2015 | Okano | H01Q 1/36 343/702 |
| 2018/0123222 | A1 * | 5/2018 | Jang | H01Q 19/005 |
| 2020/0083607 | A1 * | 3/2020 | Higaki | H01Q 1/36 |
| 2021/0194126 | A1 | 6/2021 | Sudo et al. | |
| 2022/0344823 | A1 * | 10/2022 | Panther | H01Q 9/285 |
| 2025/0279583 | A1 * | 9/2025 | Koparan | H01Q 1/523 |

FOREIGN PATENT DOCUMENTS

| | | | |
|---|---|---|---|
| JP | 2018-170561 | A | 11/2018 |
| WO | 2019/188471 | A1 | 10/2019 |

* cited by examiner

ANTENNA APPARATUS

CROSS REFERENCE TO RELATED APPLICATIONS

This is a continuation application of PCT International Application No. PCT/JP2023/014083, filed on Apr. 5, 2023, which in turn claims the benefit of Japanese Patent Application No. 2022-090204, filed on Jun. 6, 2022, the entire disclosures of which Applications are incorporated by reference herein.

TECHNICAL FIELD

The present disclosure relates to an antenna apparatus.

BACKGROUND ART

In a sensor terminal that configures a wireless sensor network, a primary battery such as a button cell, a solar cell, a thermoelectric conversion element, or the like is commonly used as a power source. However, there is a problem in that battery replacement is necessary for a primary battery, and the material cost is high in a solar cell and a thermoelectric conversion element. Such a problem related to the power source constitutes a barrier to the widespread adoption of a wireless sensor network.

In a sensor system that uses a radio frequency identifier (RFID) as a communicator, the sensor system cannot actively transmit communication signals, and thus, the sensor system has low power consumption, and can utilize energy harvesting as a power source. The RF energy harvesting utilizes wireless power for a part or all of the power source. Thus, a sensor terminal that is wireless and does not require battery replacement can be achieved.

Wireless power distributed in the environment varies greatly depending on the distance from the transmitter, reflection, interference, and the like, which poses a problem when applying the wireless power to a sensor terminal. Accordingly, there is a demand for achieving a high-efficiency sensor drive by RF energy harvesting through a power management configuration.

One of the methods of wireless power transmission is distributed power supply. In this technique, the phase of each antenna is controlled by disposing a plurality of antennas on the ceiling, which decreases the exposure level to a person and supplies high power in a pinpoint manner. In order to achieve this technique, it is necessary to efficiently transmit power from a power transmitter, and further, it is necessary to design an antenna that is small and has high efficiency.

For example, Patent Literature (hereinafter referred to as "PTL") 1 discloses a circular polarization antenna including: an inverted F antenna provided on one side, which is one side of two sides orthogonal to each other, of a rectangular ground conductor plate; a dipole antenna provided on the other side of the two sides; and an EM power feeder that is disposed to face each of open ends of both the antennas. In this technique, the circular polarization antenna is downsized and is made highly efficient by using single-point power feeding via the EM power feeder for the inverted F antenna ($\lambda/4$ type) and the dipole antenna ($\lambda/2$ type) that are orthogonally disposed on a metal plate.

CITATION LIST

Patent Literature

PTL 1
Japanese Patent Application Laid-Open No. 2018-170561

SUMMARY OF INVENTION

Technical Problem

Meanwhile, the performance required for an antenna used in wireless power transmission includes being downsized such that a plurality of antennas is disposed on a ceiling, having high efficiency to enhance power efficiency, having circular polarization directivity because the direction of the reception antenna is random, having an antenna pattern suitable for distributed power supply, and the like.

Further, generally, the emission pattern of an antenna suitable for distributed power supply has a secant squared characteristic in which radio waves emitted in the linear direction are small and radio waves emitted at both ends are large. The secant squared characteristic is different only in the way the angle $\theta$ is considered, and is therefore similar to that in the cosecant squared beam in a radar and a base station antenna. A conical beam is considered to be effective in reproducing this secant squared characteristic.

However, the emission pattern of a circular polarization antenna in the related art is often an elliptical polarization, and often has a bias in the emission direction of the radio waves. In addition, there is a problem in that the antenna is large in size when used as an antenna for distributed power supply.

An object of the present disclosure is to provide an antenna apparatus capable of having a wide directivity while being downsized.

An antenna apparatus according to the present disclosure includes: a first element having a flat plate shape; and a second element that includes a plate-like portion provided parallel to the first element. The plate-like portion includes: three or more power feeding paths each of which radially extends from a power feeder in a central portion; and three or more antenna portions which extend from ends of the three or more power feeding paths, respectively, and each of which is connected to a grounding portion of the first element.

Advantageous Effects of Invention

According to the present disclosure, it is possible to have a wide directivity while being downsized.

DESCRIPTION OF EMBODIMENTS

Embodiment

Figure 1:
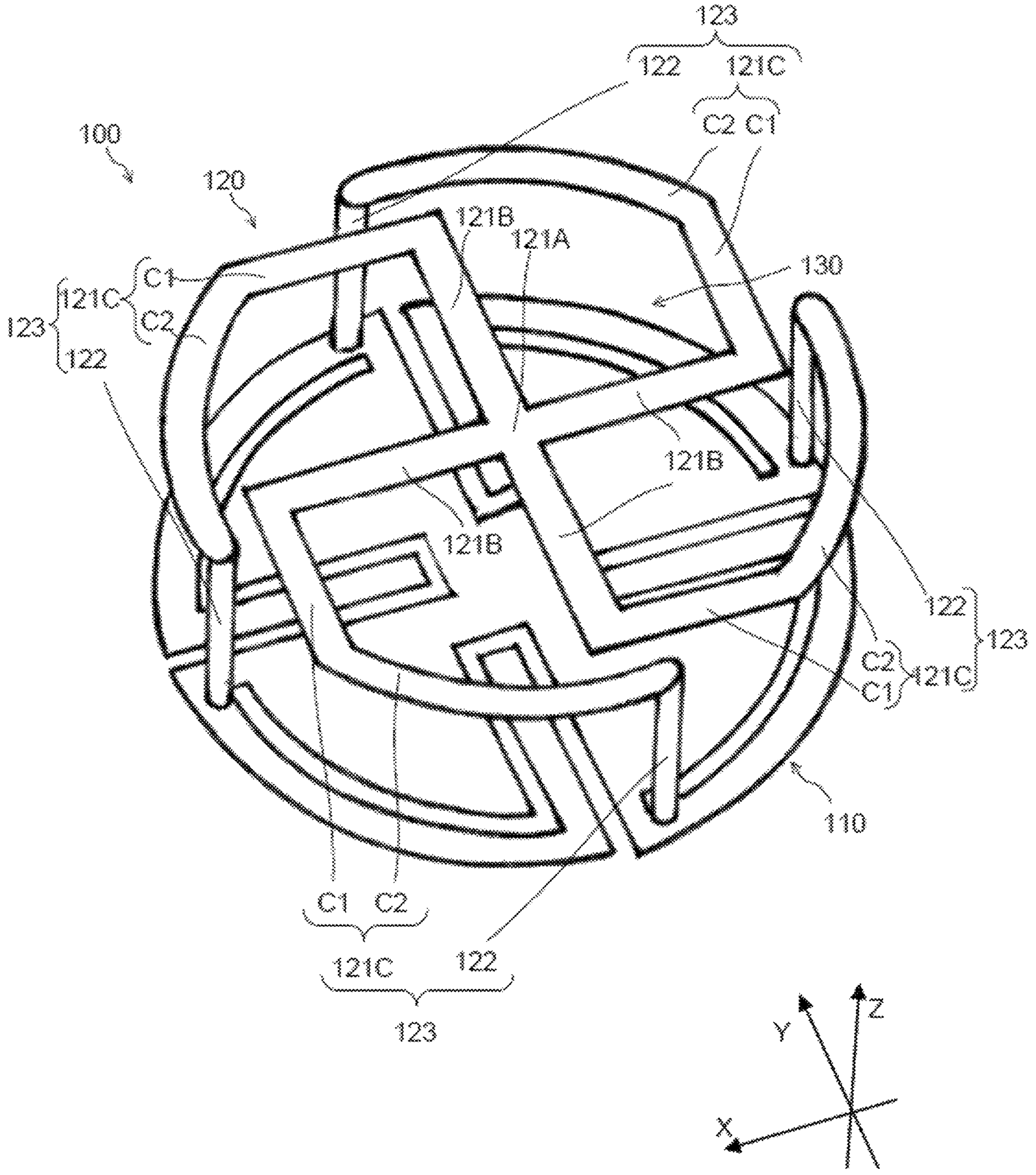
FIG. 1 is a diagram illustrating an antenna apparatus according to an embodiment of the present disclosure.

Hereinafter, an embodiment of the present disclosure will be described in detail with reference to the accompanying drawings. FIG. 1 is a diagram illustrating antenna apparatus 100 according to an embodiment of the present disclosure. Note that, an orthogonal coordinate system (X, Y, Z) is used for the description in the embodiment. The drawings to be described later are also illustrated with the common orthogonal coordinate system (X, Y, Z).

For example, antenna apparatus 100 is installed on the XY plane (horizontal plane) with the X-axis and Y-axis, which are orthogonal to each other. That is, the X and Y directions are directions that are parallel to the horizontal direction, and the Z direction is a direction that is vertical to the horizontal direction.

As illustrated in FIG. 1, antenna apparatus 100 is a transmission antenna used, for example, in a wireless power transmission system, and emits a conical beam of circular polarization. Antenna apparatus 100 includes first element 110 and second element 120.

Figure 2:
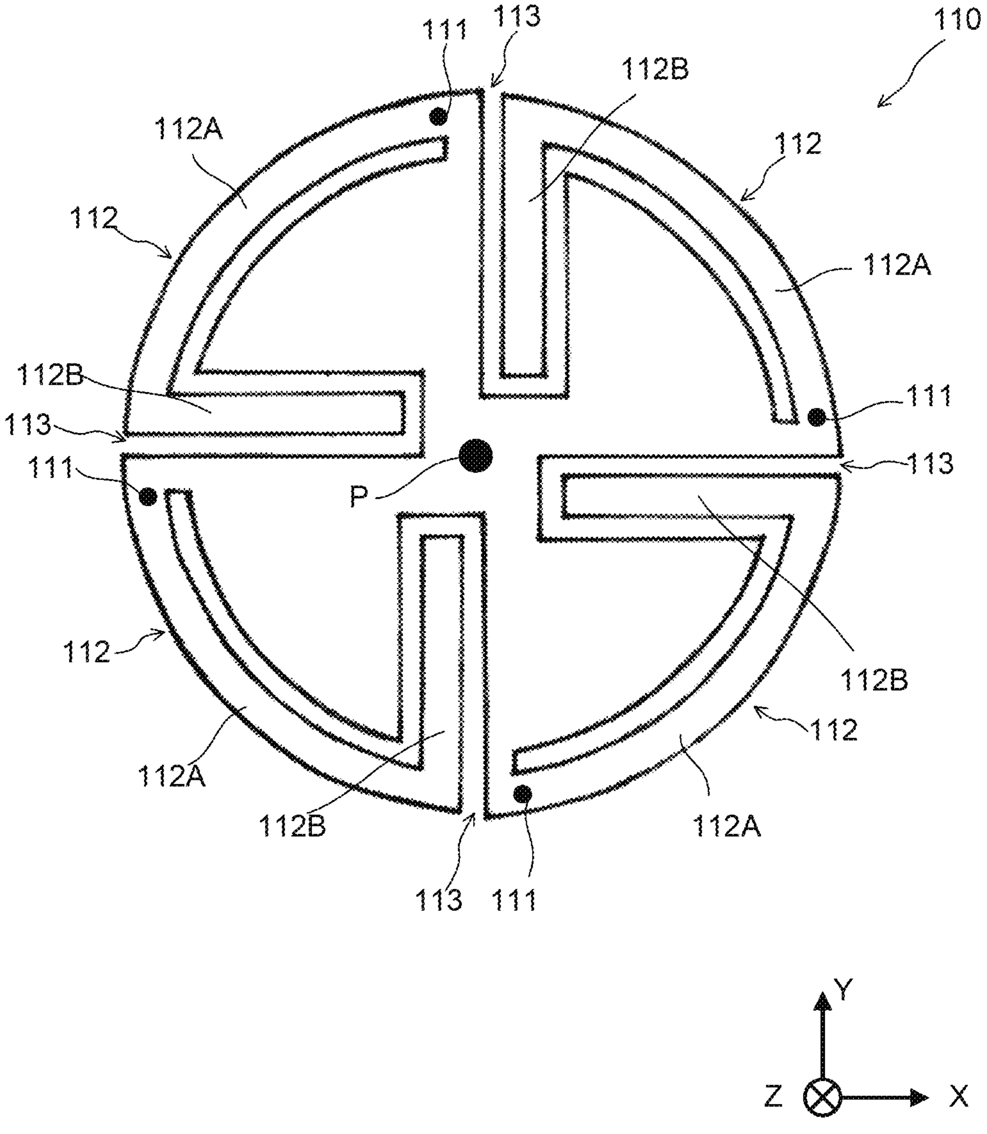
FIG. 2 is a diagram illustrating a first element.

As illustrated in FIG. 2, first element 110 is a flat plate-shaped conductor plate configured in a circular shape, and is a portion attached to the installation location of antenna apparatus 100. A connector of a coaxial cable for supplying a power source is connected to center P of first element 110, and it is possible to supply a current to power feeder 121A of second element 120 to be described later.

Grounding portion 111 connected to the ground is provided in first element 110. Grounding portion 111 is a portion connected to second element 120, and four grounding portions 111 are provided in positions corresponding to the outer edge of first element 110. Note that, each grounding portion 111 may be connected on first element 110.

Four grounding portions 111 are disposed such that the interval between the adjacent two grounding portions 111 is equal. For example, in the present embodiment, the interval between two adjacent ground portions 111 is an interval such that each angle formed by two lines each of which connects one grounding portion 111 with center P of first element 110 is identical (90 degrees in the present embodiment). Note that, the identical angle range includes not only an exactly identical angle but also angles in a smaller range (for example, one or two degrees).

Further, first element 110 includes first element-side antenna portion 112. A total of four first element-side antenna portions 112 are provided corresponding to four grounding portions 111, respectively, and each first element-side antenna portion 112 includes first portion 112A and second portion 112B. Note that, each first element-side antenna portion 112 has the same shape, and thus, only one first element-side antenna portion 112 will be described below, and a description of other first element-side antenna portions 112 will be omitted.

First portion 112A extends along the outer edge of first element 110 from a position corresponding to grounding portion 111, for example, in the counterclockwise direction in FIG. 2. First portion 112A extends to a position corresponding to a front side of another grounding portion 111 adjacent to grounding portion 111 in the base end position in the counterclockwise direction.

Second portion 112B extends linearly toward the center of first element 110 from an end of first portion 112A, where the end is on a side opposite to grounding portion 111 in the base end position of first portion 112A. Second portion 112B extends to a position corresponding to a front side of the center of first element 110.

Further, the length of first element-side antenna portion 112 is a fourth of the wavelength of a radio wave that antenna apparatus 100 emits. Note that, the length of first element-side antenna portion 112 may be appropriately set according to the wavelength of a radio wave that antenna apparatus 100 emits.

First element-side antenna portion 112 is formed by forming notch 113 in first element 110. That is, notch 113 is a portion in which first element 110 is notched out such that first element-side antenna portion 112 includes a first end that corresponds to grounding portion 111 and a second end that is a free end.

Notch 113 is formed along first element-side antenna portion 112 such that there is a substantially constant interval between first element-side antenna portion 112 and first element 110 excluding first element-side antenna portion 112. Note that, notch 113 is provided for each first element-side antenna portion 112, and every notch 113 has the same shape.

Thus, by forming first element-side antenna portion 112 having a constant length from a portion corresponding to grounding portion 111 with notch 113, it is possible to cause a part of first element 110 to function as an antenna.

Further, the width of notch 113 is appropriately set to approximately a length that does not affect the impedance in antenna apparatus 100 (for example, the width of notch 113 is two mm in a case where the width of first element-side antenna portion 112 is four mm, or the like).

As illustrated in FIG. 1, second element 120 is an element that is provided on the + side of first element 110 in the Z direction, and has a function of supplying power to antenna apparatus 100 and a function as an antenna. Second element 120 includes plate-like portion 121 and connection portion 122.

Plate-like portion 121 is disposed parallel to first element 110, and is provided at an interval from first element 110. For this reason, an air layer 130 is provided between first element 110 and second element 120. Note that, the parallel range includes not only exactly parallel but also parallel with a slight inclination (for example, with an inclination of about one or two degrees).

Plate-like portion 121 has a circular shape contour, and has an outer diameter identical to that of the circular shape of first element 110. That is, plate-like portion 121 has a contour having a shape identical to the shape of first element 110. Plate-like portion 121 includes power feeder 121A, power feeding path 121B, and antenna portion 121C.

Power feeder 121A is a central portion of plate-like portion 121, and is a portion through which power is supplied to antenna apparatus 100. Power feeder 121A is disposed in the same position as center P of first element 110 in the X and Y directions, and supplies current, which is transmitted through a coaxial cable connected to first element 110 described above, to antenna portion 121C.

Power feeding path 121B is a portion that radially extends from power feeder 121A, and forms a path for supplying power to antenna portion 121C. A total of four power feeding paths 121B are provided, and each of power feeding paths 121B has the same shape. Four power feeding paths 121B are provided such that each angle formed by two adjacent power feeding paths 121B among power feeding paths 121B is identical (90 degrees in the present embodiment). Note that, the identical angle range includes not only an exactly identical angle but also angles in a smaller range (for example, one or two degrees).

Antenna portion 121C is a portion that functions as a part of the antenna on the side of second element 120 due to the power supplied from power feeder 121A. Antenna portion 121C is provided in each of four power feeding paths 121B and each antenna portion 121C has the same shape. Antenna portion 121C includes linear portion C1 and arc portion C2.

Linear portion C1 extends from an end of power feeding path 121B in a direction orthogonal to power feeding path 121B. Further, each linear portion C1 extends on the side on which another power feeding path 121B, which is located on the downstream side of power feeding path 121B corresponding to the base end in the counterclockwise direction, extends, so as to avoid interference with each other.

Arc portion C2 is connected to an end, which is on a side opposite to power feeding path 121B, of linear portion C1 and is configured in an arc shape.

The arc of arc portion C2 is configured to be substantially the same as the arc of first element 110. Arc portion C2 is disposed, for example, so as to overlap with the outer edge of first element 110 when viewed from the Z direction. Arc portion C2 extends in the counterclockwise direction (counterclockwise direction in the XY plane in FIG. 1) from the end of linear portion C1 to a position corresponding to grounding portion 111 of first element 110. Note that, arc portion C2 may be disposed to be shifted from the outer edge of first element 110.

Connection portion 122 is a portion that connects antenna portion 121C with grounding portion 111 of first element 110, and functions as a part of the antenna on the side of second element 120. Connection portion 122 is provided vertical to antenna portion 121C. Connection portion 122 extends from an end of arc portion C2 of antenna portion 121C, where the end is on a side opposite to an end, on a side of linear portion C1 (a side of power feeding path 121B), of arc portion C2 to the—side in the Z direction, and is connected to grounding portion 111. Note that, as a vertical range, the range includes not only exactly vertical (90 degrees) but also vertical with a slight shift from 90 degrees (for example, with a shift of about one or two degrees).

In second element 120 configured as described above, antenna portion 121C and connection portion 122 are supplied with power through power feeder 121A and power feeding path 121B, and thus, antenna portion 121C and connection portion 122 function as an antenna on the side of the second element (hereinafter referred to as the second element-side antenna portion 123).

Further, the length of the second element-side antenna portion (the sum of the lengths of antenna portion 121C and connection portion 122) is a fourth of the wavelength of a radio wave that antenna apparatus 100 emits. For example, in a case where the resonant frequency of antenna apparatus 100 is 920 MHz and the diameter of first element 110 is set to 70 mm, the length of connection portion 122 can be set to be approximately 25 mm. Note that, as long as the length of the second element-side antenna portion is a fourth of the wavelength of the radio wave, the lengths of connection portion 122 and antenna portion 121C can be appropriately adjusted.

Radio waves are emitted from the power-supplied second element-side antenna portion. Specifically, a current flows through antenna portion 121C in a direction parallel to the X and Y directions (the horizontal direction), and a Φ wave parallel to the horizontal direction is emitted. Further, a current flows through connection portion 122 in the Z direction (vertical direction) vertical to the horizontal direction, and a θ wave parallel to the vertical direction is emitted.

Further, the current that has flowed through the second element-side antenna portion is sent to first element-side antenna portion 112 connected to grounding portion 111, and radio waves are also emitted from first element-side antenna portion 112. That is, when a current flows through first element-side antenna portion 112 in the horizontal direction, a Φ wave parallel to the horizontal direction is emitted.

As described above, in antenna apparatus 100, Φ and θ waves are emitted to the same extent, and thus, it is possible to create a circular polarization close to a perfect circle.

Further, since the four second element-side antenna portions 123 are configured in the same shape, four first element-side antenna portions 112 are configured in the same shape, and are disposed at equal intervals, the phase difference between radio waves is separated by 90 degrees. For this reason, it is possible to configure a conical beam circular polarization antenna that cancels emission in the front direction (Z direction) and emits largely in the surroundings (X direction and Y direction).

Figure 3:
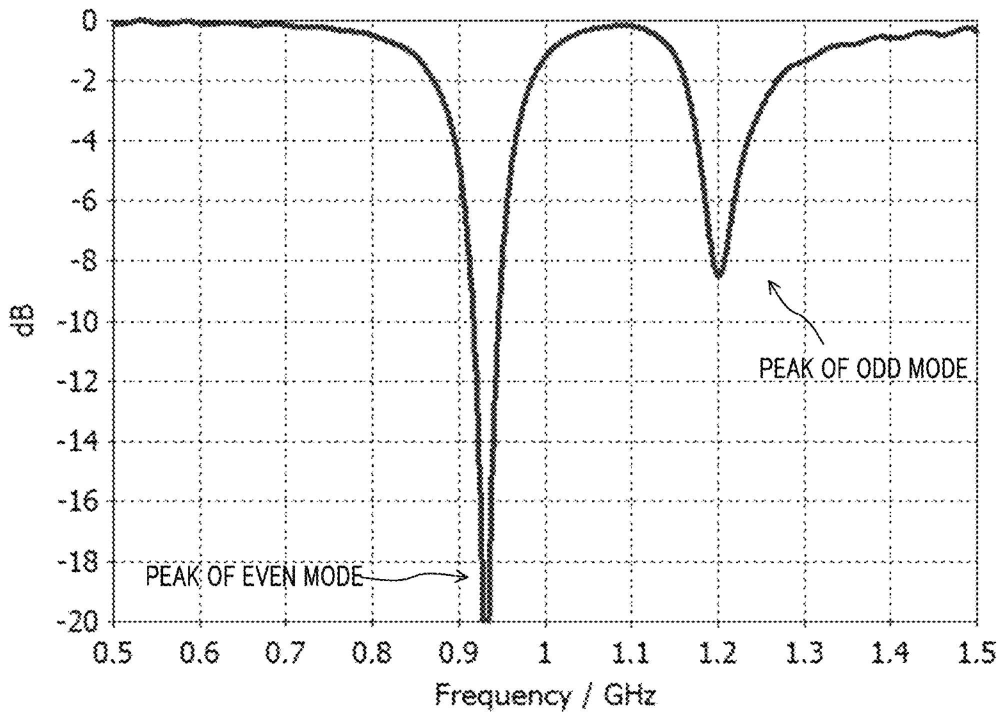
FIG. 3 is a diagram illustrating return loss characteristics of the antenna apparatus according to the present embodiment.

Next, simulation results of the antenna characteristics of antenna apparatus 100 according to the present embodiment will be described. FIG. 3 is a diagram illustrating return loss characteristics of antenna apparatus 100 according to the present embodiment. In FIG. 3, the horizontal axis represents frequency (GHz) and the vertical axis represents return loss characteristics (dB).

As illustrated in FIG. 3, the resonant frequency of antenna apparatus 100 is polarized into 920 MHz, which is a peak of the even mode, and 1.2 GHz, which is a peak of the odd mode.

For example, in the configuration described in PTL 1, the resonant frequency of the inverted F antenna is 2.310 GHz, and the resonant frequency of the dipole antenna is 2.55 GHz, and thus, the resonant frequency is 2.44 GHz for the circular polarization antenna.

In contrast, in the present embodiment, it is possible to decrease the resonant frequency significantly as compared to the configuration in the related art, for example, by extracting 920 MHz (even mode) on the low-frequency side. These characteristics can contribute to the downsizing of antenna apparatus 100.

Further, the fractional bandwidth of antenna apparatus 100 is 5.4%. Since the fractional bandwidth of the general patch antenna is 3% to 4%, it can be confirmed that the fractional bandwidth of antenna apparatus 100 according to the present embodiment has an excellent value compared to the general patch antenna.

Figure 4:
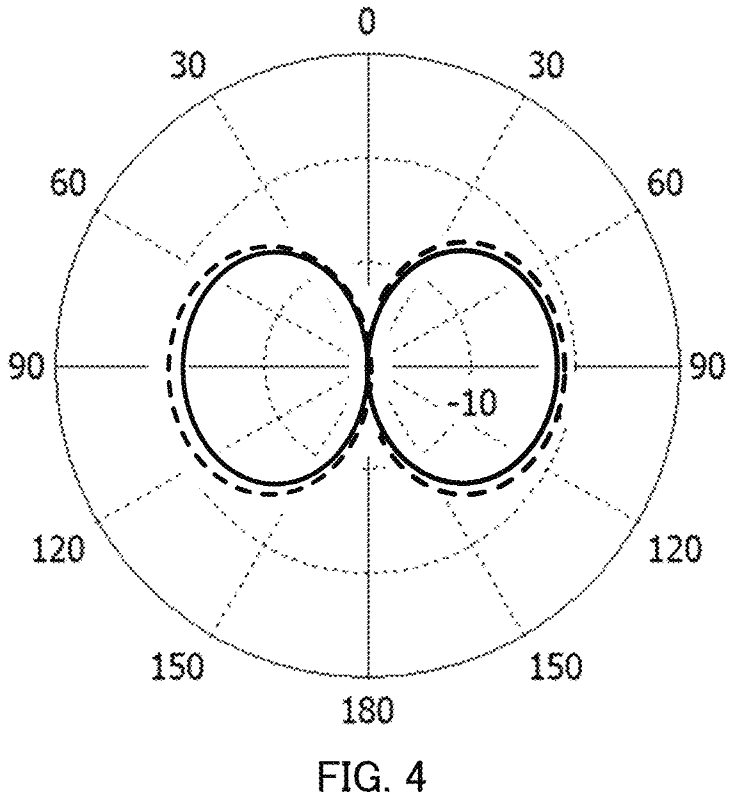
FIG. 4 is a diagram illustrating a linear polarization pattern of the antenna apparatus according to the present embodiment.

FIG. 4 is a diagram illustrating a linear polarization pattern of antenna apparatus 100 according to the present embodiment. FIG. 4 illustrates the emission pattern of the θ wave with a solid line and the emission pattern of the Φ wave with a broken line.

As illustrated in FIG. 4, the difference between the θ wave and the Φ wave is within 2 dB, and it can be confirmed that the θ wave and the Φ wave are emitted to the same extent. The emission patterns of the θ wave and the Φ wave are adjustable by changing the lengths of the first element-side antenna portion and the second element-side antenna portion.

Figure 5:
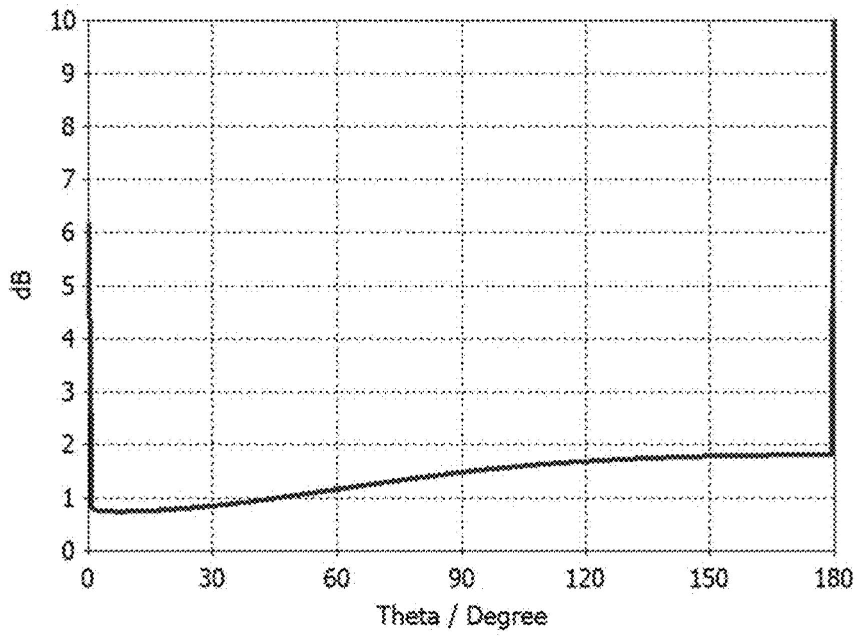
FIG. 5 is a diagram illustrating axial ratio characteristics of the antenna apparatus according to the present embodiment.

FIG. 5 is a diagram illustrating axial ratio characteristics of antenna apparatus 100 according to the present embodiment. In FIG. 5, the horizontal axis represents angle (deg) and the vertical axis represents axial ratio (dB).

For example, in the configuration described in PTL 1, the axial ratio characteristics of 3 dB or less are 136.9 degrees to 205.6 degrees and 333.7 degrees to 43.3 degrees.

In contrast, as illustrated in FIG. 5, since the axial ratio characteristics of antenna apparatus 100 according to the present embodiment fall within 2 dB or less over a wide angle range, it can be confirmed that circular polarization close to perfect circular polarization is emitted. From this, it can be confirmed that, in comparison with the configuration in the related art, antenna apparatus 100 according to the present embodiment makes it possible to obtain more excellent axial ratio characteristics.

Figure 6:
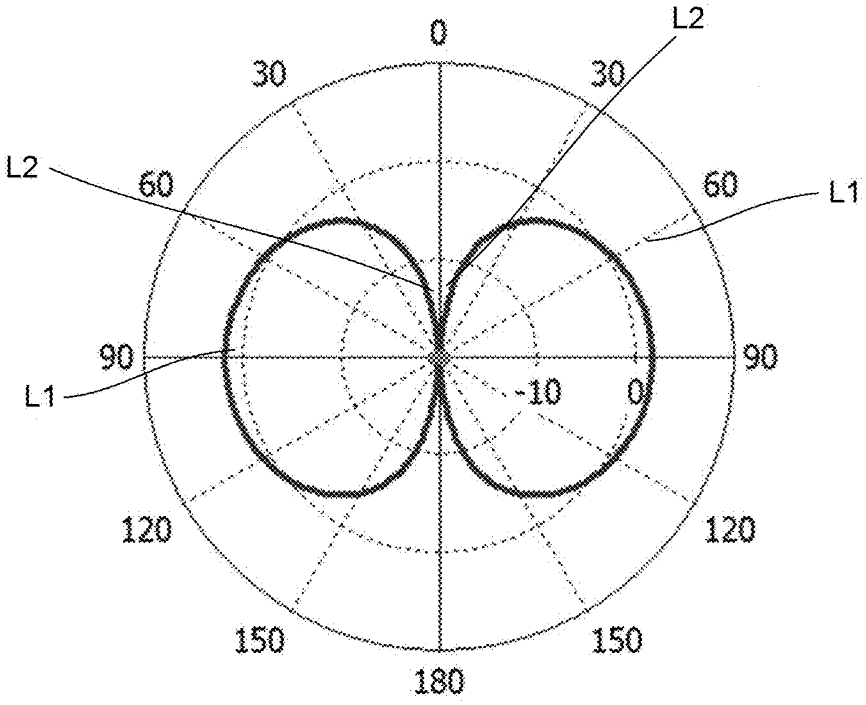
FIG. 6 is a diagram illustrating directivity characteristics of the antenna apparatus according to the present embodiment.

FIG. 6 is a diagram illustrating directivity characteristics of antenna apparatus 100 according to the present embodiment. In FIG. 6, L1 represents left-hand circular polarization and L2 represents right-hand circular polarization.

As illustrated in FIG. 6, it can be confirmed that in antenna apparatus 100, mainly left-hand circular polarization is emitted, and right-hand circular polarization is not emitted. More specifically, since arc portion C2 of antenna portion 121C extends in the counterclockwise direction from the end of linear portion C1, and first portion 112A extends in the counterclockwise direction from grounding portion 111, antenna apparatus 100 in the present embodiment is configured to emit left-hand circular polarization. Therefore, from the results illustrated in FIG. 6, it can be confirmed that right-hand circular polarization is not emitted, and thus, it is possible to confirm that the emission efficiency is excellent with antenna apparatus 100 without the emission of the left-hand circular polarization being canceled.

Figure 7:
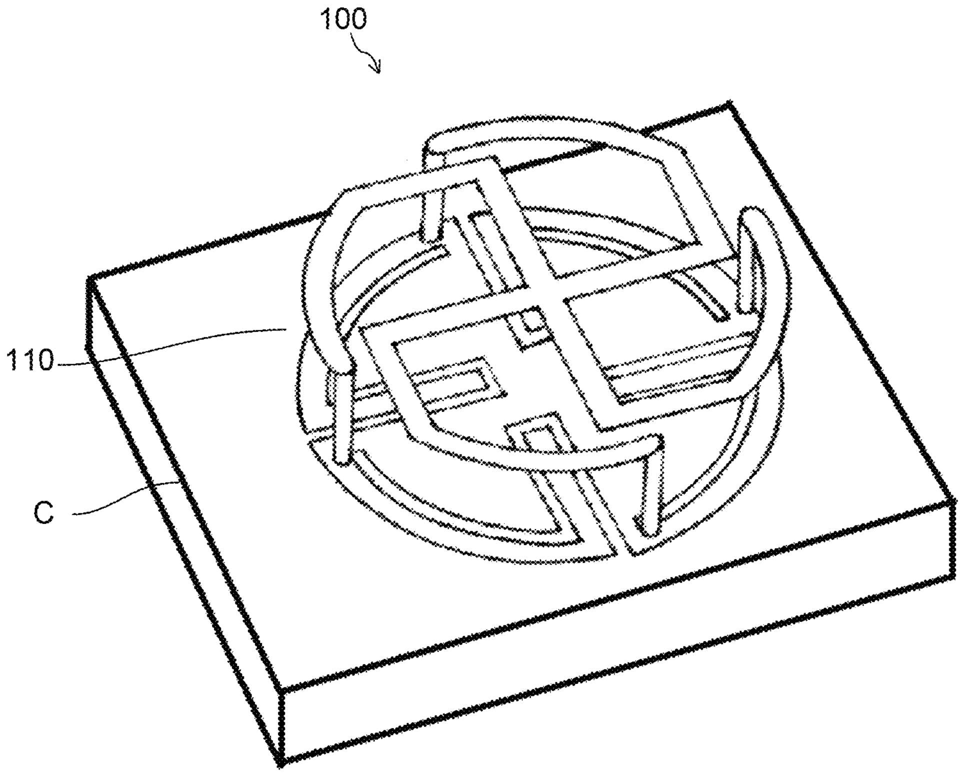
FIG. 7 is a diagram illustrating the antenna apparatus with the first element being grounded to concrete.

Next, the disturbance resistance of antenna apparatus 100 will be described. FIG. 7 is a diagram illustrating antenna apparatus 100 with first element 110 being grounded to concrete C.

Figure 8:
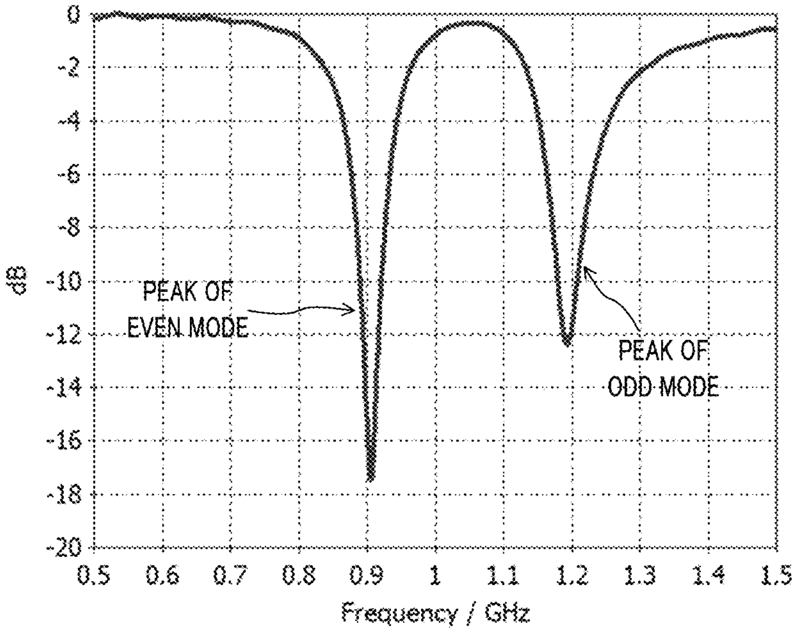
FIG. 8 is a diagram illustrating the return loss characteristics of the antenna apparatus illustrated in FIG. 7.

Antenna apparatus 100 is used with, for example, first element 110 being grounded to concrete C as illustrated in FIG. 7. In this case, as illustrated in FIG. 8, the return loss characteristics can be confirmed that the peaks are slightly shifted toward the low-frequency side for both the even mode and the odd mode compared to the return loss characteristics of the configuration without being grounded to concrete C illustrated in FIG. 1 (see FIG. 3).

This is a small difference from the configuration illustrated in FIG. 1, and thus, for example, it is possible to match the resonant frequency to be targeted (for example, 920 MHz or the like) by finely adjusting the length(s) of the connection portion and/or the antenna portion in the second element-side antenna portion. Further, the length of the first element-side antenna portion may be finely adjusted.

Figure 9:
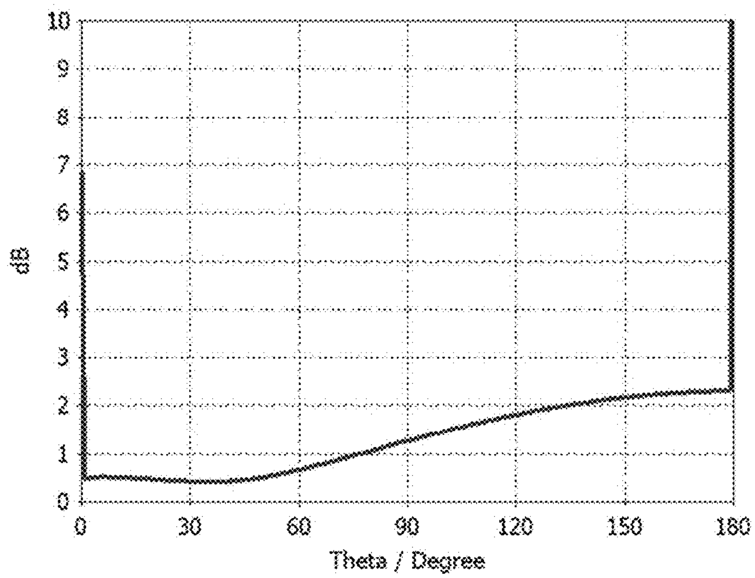
FIG. 9 is a diagram illustrating the axial ratio characteristics of the antenna apparatus illustrated in FIG. 7.

Further, as illustrated in FIG. 9, since the axial ratio characteristics become 2 dB or more in the vicinity of 130 degrees to 180 degrees, but fall within 3 dB or less, it can be confirmed that the axial ratio characteristics fall within the range of excellent circular polarization in a wide area.

Figure 10:
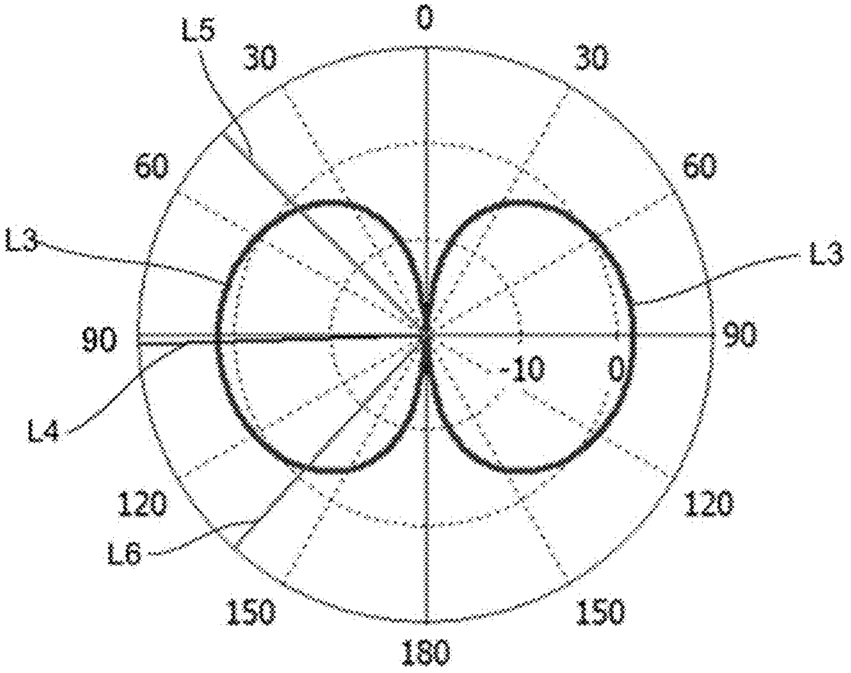
FIG. 10 is a diagram illustrating the directivity characteristics of the antenna apparatus illustrated in FIG. 7.

Further, as illustrated in FIG. 10, the directivity characteristic (L3 in FIG. 10) has a result that is substantially the same when compared to the directivity characteristics of the configuration without being grounded to concrete C illustrated in FIG. 1 (see FIG. 4). Note that, L4 in FIG. 10 indicates a part in which the emission of the radio waves is the strongest, and L5 and L6 indicate parts in which the emission intensity of the radio waves is smaller than that in L4 by 3 dB.

Figure 11:
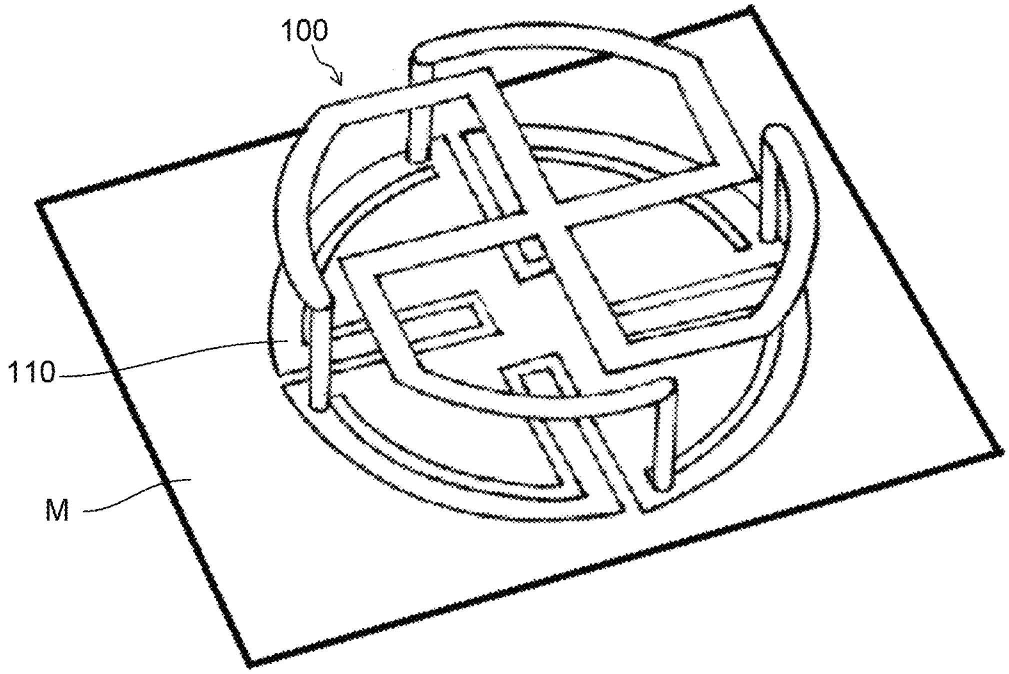
FIG. 11 is a diagram illustrating the antenna apparatus with the first element grounded to a metal foil.
Figure 12:
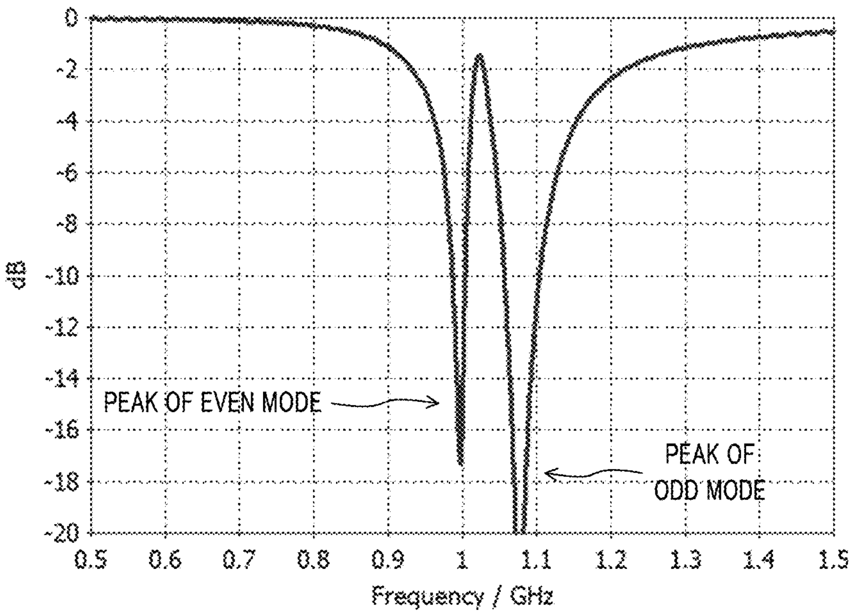
FIG. 12 is a diagram illustrating the return loss characteristics of the antenna apparatus illustrated in FIG. 11.

Further, antenna apparatus 100 is used with, for example, first element 110 being grounded to metal foil M as illustrated in FIG. 11. It can be confirmed that in this case, the return loss characteristics, as illustrated in FIG. 12, differ from the return loss characteristics of the configuration with being grounded to concrete C illustrated in FIG. 7 (see FIG. 8), and that the resonant frequencies are shifted such that the even mode is shifted to the high-frequency side and the odd mode is shifted to the low-frequency side.

This is also a small difference from configuration illustrated in FIG. 1, and thus, for example, it is possible to match the resonant frequency to be targeted (for example, 920 MHz or the like) by finely adjusting the length(s) of the connection portion and/or the antenna portion in the second element-side antenna portion. Further, the length of the first element-side antenna portion may be finely adjusted.

Figure 13:
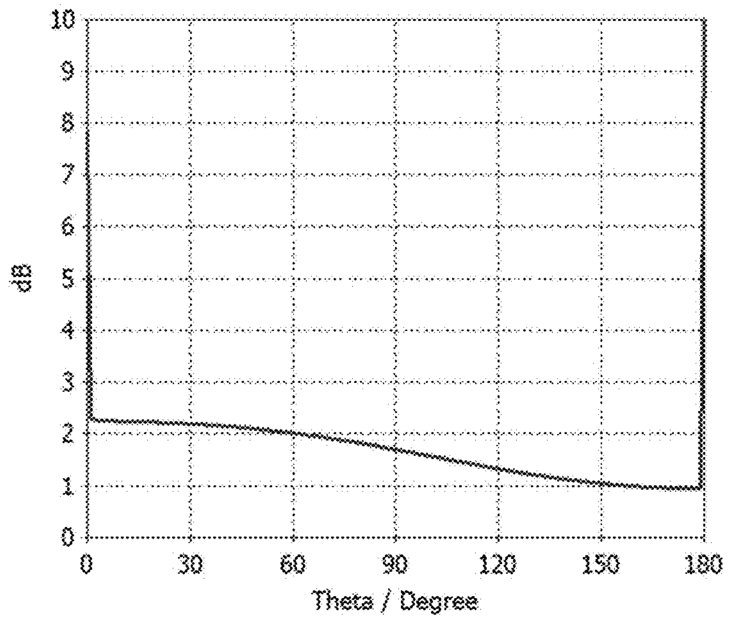
FIG. 13 is a diagram illustrating the axial ratio characteristics of the antenna apparatus illustrated in FIG. 11.

Further, as illustrated in FIG. 13, since the axial ratio characteristics become 2 dB or more in the vicinity of zero degree to 60 degrees, but fall within 3 dB or less, it can be confirmed that the axial ratio characteristics fall within the range of excellent circular polarization in a wide area.

Figure 14:
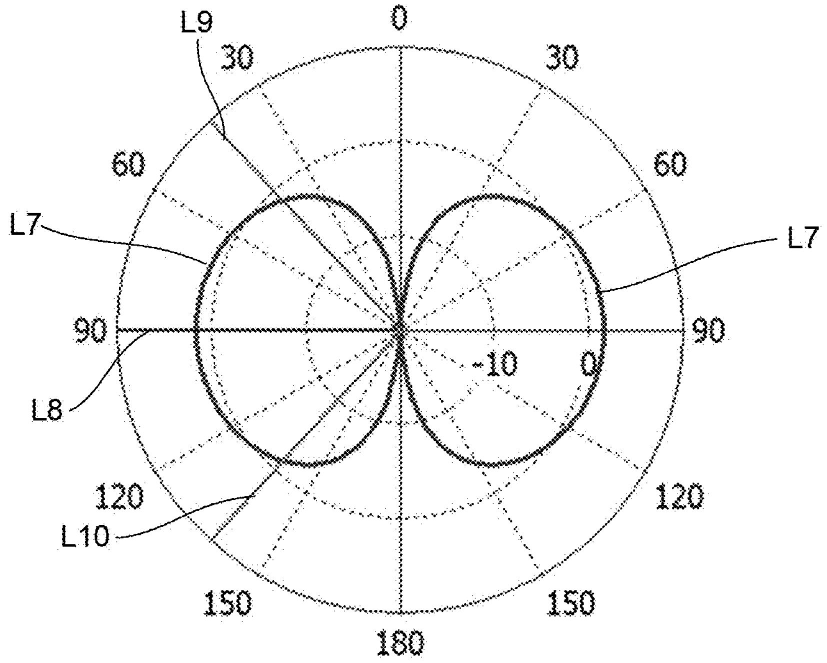
FIG. 14 is a diagram illustrating the directivity characteristics of the antenna apparatus illustrated in FIG. 11.

Further, as illustrated in FIG. 14, the directivity characteristic (L7 in FIG. 14) has a result that is substantially the same when compared to the directivity characteristics of the configuration without being grounded to metal foil M illustrated in FIG. 1. Note that, L8 in FIG. 14 indicates a part in which the emission of the radio waves is the strongest, and L9 and L10 indicate parts in which the emission intensity of the radio waves is smaller than that in L8 by 3 dB.

From those described above, no significant change in the characteristics is observed when first element 110 is grounded to another object in the configurations illustrated in FIGS. 7 and 11, respectively. As a result, it can be confirmed that antenna apparatus 100 according to the present embodiment has resistance to disturbances.

Next, an application example of antenna apparatus 100 according to the present embodiment will be described. FIG.

15 is a diagram illustrating an example in which second element 120 of antenna apparatus 100 is a board.

Figure 15:
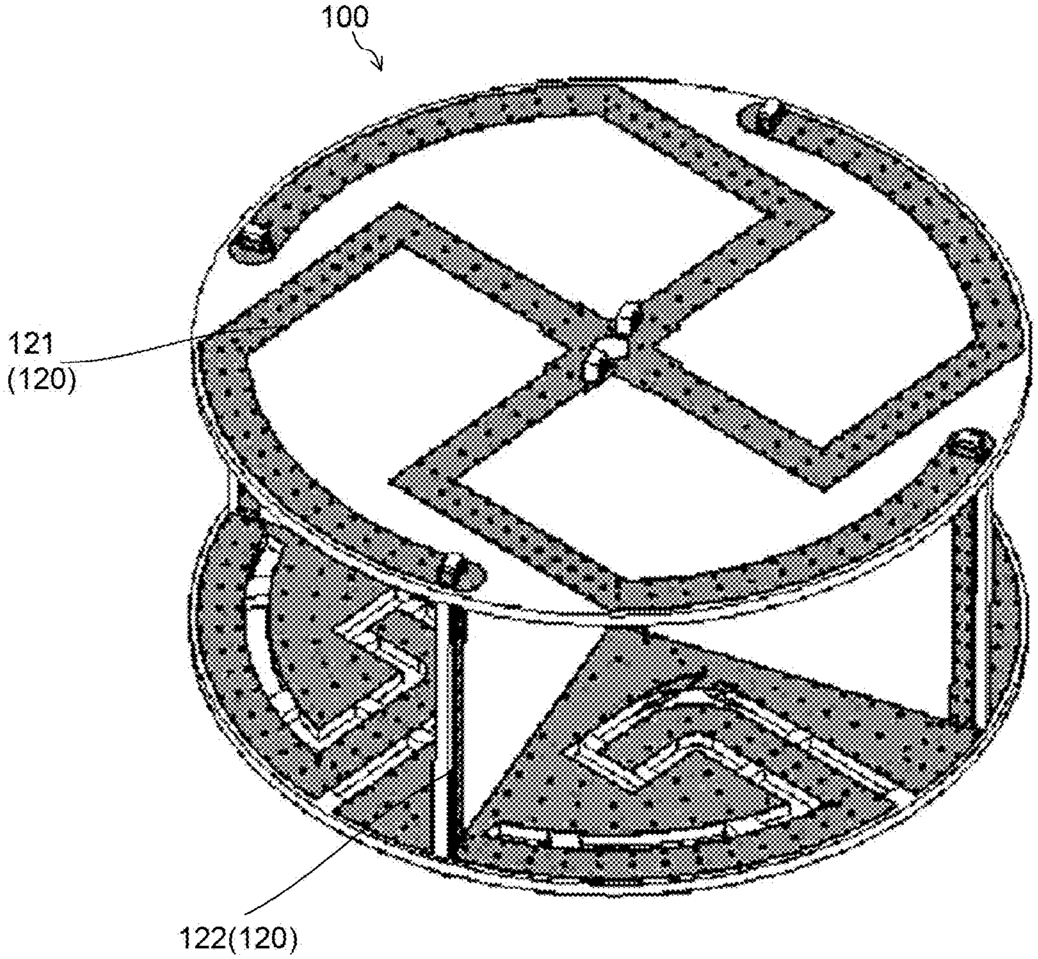
FIG. 15 is a diagram illustrating an example in which a second element of the antenna apparatus is a board.
Figure 16:
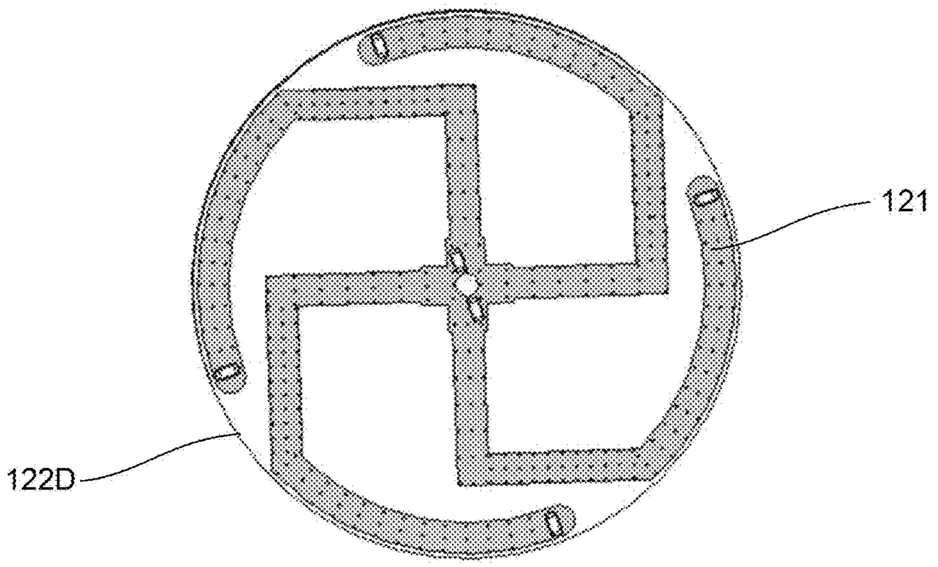
FIG. 16 is a diagram illustrating a plate-like portion of the antenna apparatus illustrated in FIG. 15.

As illustrated in FIG. 15, plate-like portion 121 and connection portion 122 of second element 120 can be formed into a board. For example, plate-like portion 121 may be configured as board 122D having a circular shape with the same shape as that of first element 110, as illustrated in FIG. 16.

Figure 17:
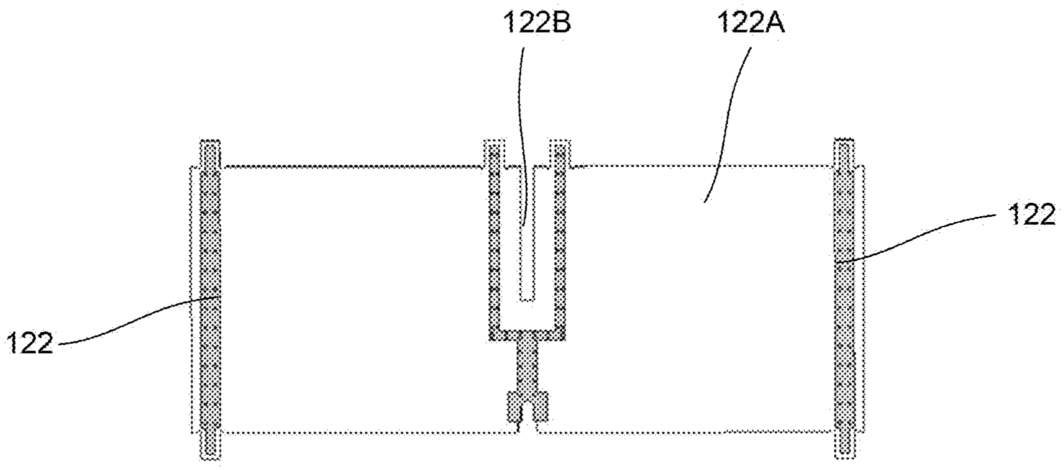
FIG. 17 is a diagram illustrating a connection portion of the antenna apparatus illustrated in FIG. 15.

Further, as illustrated in FIG. 17, connection portion 122, for example, can be configured as board 122A having a rectangular shape, which includes connection portion 122 located on the opposite side with respect to the center of plate-like portion 121. In this case, engaging groove 122B that makes it possible to cause two boards to be engaged is formed in a central portion of the board. By engaging groove 122B with engaging groove 122B of another board 122A, it is possible to provide four connection portions 122 disposed at equal intervals (90 degrees intervals).

Figure 18:
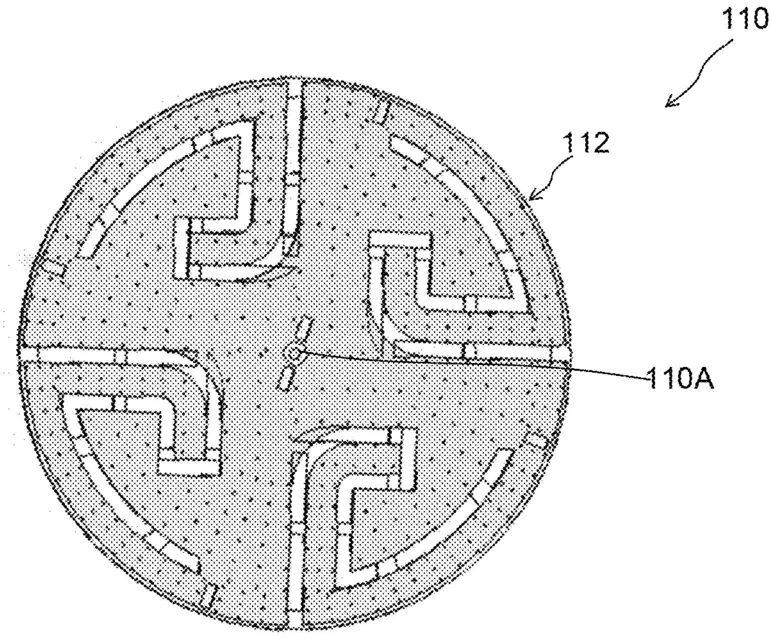
FIG. 18 is a diagram illustrating the first element of the antenna apparatus illustrated in FIG. 15.

Further, as illustrated in FIG. 18, coaxial cable connector connection portion 110A is provided in a central portion of first element 110. A current is supplied to plate-like portion 121 through this connector connection portion 110A. Further, each metal part of the portions may be configured to have a shape obtained by attaching copper foil to the top and bottom of the board and establishing vertical conductivity through a via(s). Further, a leading-end portion of first element-side antenna portion 112 may have a configuration in which the leading-end portion of first element-side antenna portion 112 is bent from that in the configuration illustrated in FIG. 2.

Figure 19:
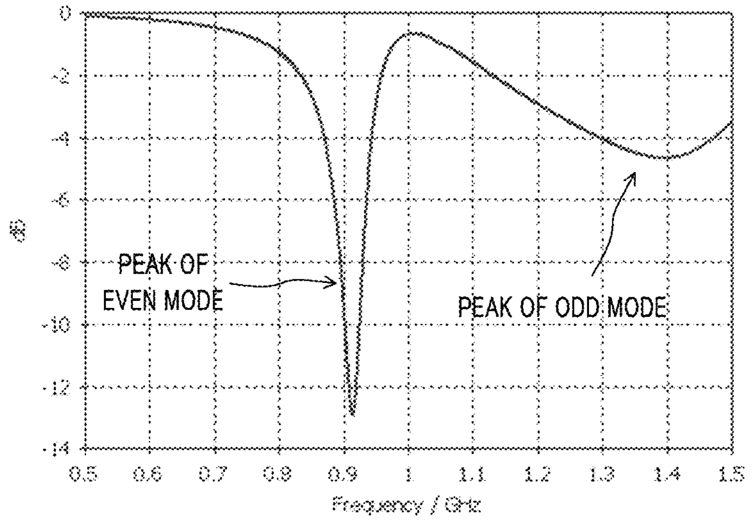
FIG. 19 is a diagram illustrating the return loss characteristics of the antenna apparatus illustrated in FIG. 15.

Further, the simulation results of the return loss characteristics in the configuration illustrated in FIG. 15, as illustrated in FIG. 19, indicate that the resonance peak of the odd mode around 1.2 GHz becomes gradual, and only the resonance of the even mode around 920 MHz appears as a peak.

That is, even in the configuration illustrated in FIG. 15, it is possible to extract only the vicinity of 920 MHz, and thus, it is possible to obtain the same characteristics as those in the configuration illustrated in FIG. 1.

Figure 20:
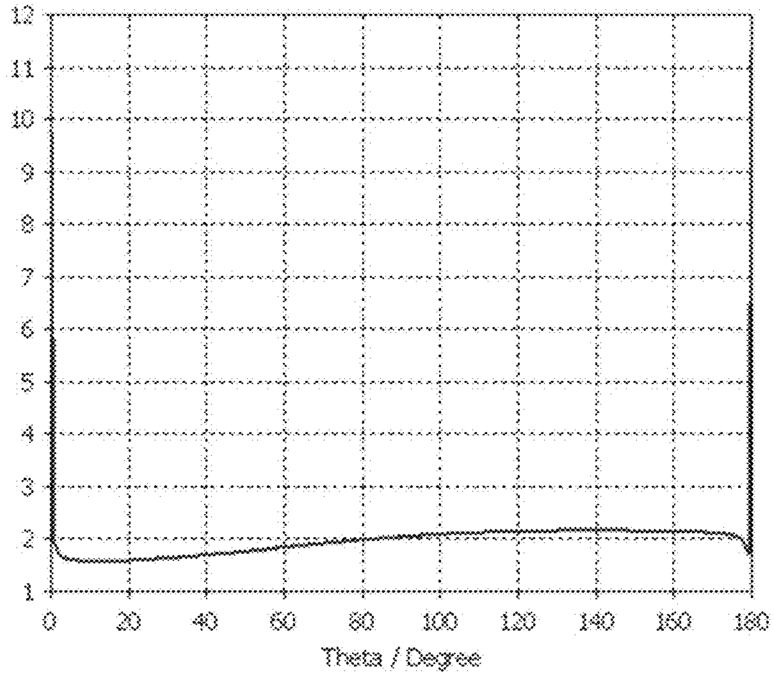
FIG. 20 is a diagram illustrating the axial ratio characteristics of the antenna apparatus illustrated in FIG. 15.

Further, it can be confirmed that as illustrated in FIG. 20, although there is a range in which the axial ratio characteristics are slightly 2 dB or more, the axial ratio characteristics fall within 3 dB or less in a wide area, and that circular polarization close to perfect circular polarization is emitted.

Figure 21:
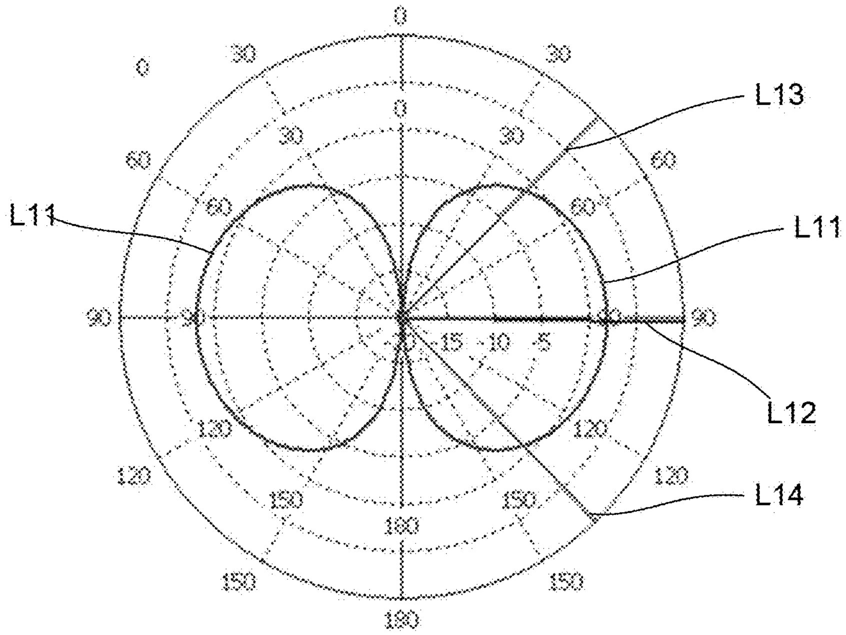
FIG. 21 is a diagram illustrating the directivity characteristics of the antenna apparatus illustrated in FIG. 15.

Further, as illustrated in FIG. 21, it can be confirmed that the directivity characteristics (L11 illustrated in FIG. 21) to the same extent as those in the configuration illustrated in FIG. 1 or the like are obtained. Note that, L12 in FIG. 21 indicates a part in which the emission of the radio waves is the strongest, and L13 and L14 indicate parts in which the emission intensity of the radio waves is smaller than that in L12 by 3 dB. Further, L12, L13, and L14 are in the opposite orientation compared to the results in FIGS. 10 and 14 due to a slight left-right difference in the emission intensity of the radio waves.

From the above, it can be confirmed that the desired characteristics are obtained even when second element 120 of antenna apparatus 100 is formed into a board.

According to the present embodiment configured as described above, since the second element-side antenna portion can be configured with antenna portion 121C and connection portion 122 in second element 120, it is possible to provide antenna apparatus 100 that emits Φ and θ waves.

Specifically, since the antenna length in the height direction (Z direction) can be secured by connection portion 122, the area in which antenna apparatus 100 is disposed can be reduced, and further, antenna apparatus 100 as a whole can be downsized.

Further, since each of a plurality of power feeding paths 121B and a plurality of antenna portions 121C has the same shape, power can be evenly supplied to each second element-side antenna portion. As a result, it is possible to obtain excellent characteristics over a wide area.

That is, in the present embodiment, it is possible to have a wide directivity while being downsized. As a result, it is possible to contribute to the practical implementation of a distributed wireless power supply system.

Further, since first element-side antenna portion 112 is provided in first element 110, it is possible to reinforce the emission of the Φ wave.

Further, by providing notch 113 in first element 110, it is possible to configure first element-side antenna portion 112, and thus, it is not necessary to provide another antenna portion, and it is possible to have a simple configuration.

Figure 22A:
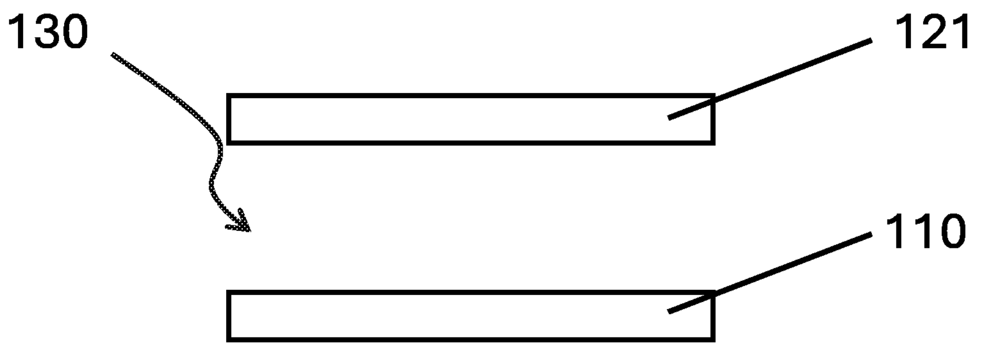
FIGS. 22A and 22B are schematic diagrams illustrating side views of an antenna apparatus according to an embodiment of the present disclosure.
Figure 22B:
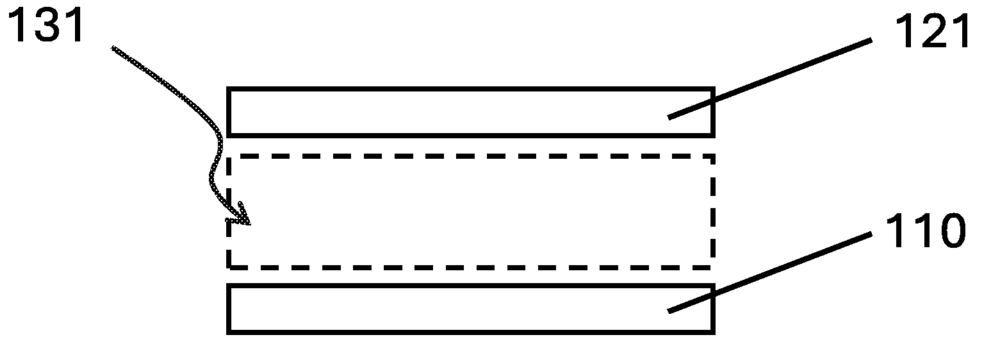

Note that, in the embodiment described above, an air layer 130 (see, FIG. 22A) is provided between first element 110 and plate-like portion 121 of second element 120, but the present disclosure is not limited to this, and a dielectric layer 131 (see, FIG. 22B) may be provided, for example.

In addition, in the embodiment described above, first element 110 and second element 120 are provided with an interval therebetween, but the present disclosure is not limited to this, and first element 110 and second element 120 may be provided to overlap with each other. In this case, the connection portions may not be provided.

Further, in the embodiment described above, antenna portion 121C is configured with linear portion C1 and arc portion C2, but the present disclosure is not limited to this, and antenna portion 121C may be configured with, for example, only the arc portion.

Further, the embodiment described above has a configuration including two elements (first element 110 and second element 120), but the present disclosure is not limited to this, and, for example, a configuration including three or more elements is possible. In this case, an element(s) other than the first element and the second element may have the same shape as that of the second element.

Further, in the embodiment described above, the number of antenna portions is four, but the present disclosure is not limited to this, and the number of antenna portions may be any number as long as it is three or more. Further, the angle between two adjacent power feeding paths is appropriately changed according to the number of antenna portions. For example, when the number of antenna portions is three, the angle between two adjacent power feeding paths is 120 degrees, and when the number of antenna portions is five, the angle between two adjacent power feeding paths is 72 degrees.

Further, in the embodiment described above, first element-side antenna portion 112 is configured with a first portion and a second portion, but the present disclosure is not limited to this, and first element-side antenna portion 112 may be configured with, for example, only the first portion.

Further, in the embodiment described above, first element-side antenna portion 112 is provided, but the present disclosure is not limited to this, and the first element-side antenna portion may be provided.

In addition, in the embodiment described above, the length of the second element-side antenna portion (the sum of the lengths of antenna portion 121C and connection portion 122) is a fourth of the wavelength of a radio wave that antenna apparatus 100 emits, but the present disclosure is not limited to this. For example, the length of the second element-side antenna portion may be n times (where n is one or more) a fourth of the wavelength of a radio wave that antenna apparatus 100 emits.

In addition, in the embodiment described above, the length of the first element-side antenna portion is a fourth of the wavelength of a radio wave that antenna apparatus 100 emits, but the present disclosure is not limited to this. For example, the length of the first element-side antenna portion may be m times (where m is one or more) a fourth of the wavelength of a radio wave that antenna apparatus 100 emits.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

The disclosure of Japanese Patent Application No. 2022-090204, filed on Jun. 2, 2022, including the specification, drawings and abstract, is incorporated herein by reference in its entirety.

INDUSTRIAL APPLICABILITY

The antenna apparatus of the present disclosure is useful as an antenna apparatus capable of having a wide directivity while being downsized.

The invention claimed is:

1. An antenna apparatus, comprising:
a first element having a flat plate-shaped conductor plate and including three or more first element-side antenna portions and three or more grounding portions; and
a second element that includes a plate-like portion provided parallel to the first element, wherein
the plate-like portion of the second element includes:
three or more power feeding paths each of which radially extends from a power feeder in a central portion; and
three or more second element-side antenna portions which extend from ends of the three or more power feeding paths, respectively, and each of which is connected to a corresponding one of the three or more grounding portions of the first element, and
the first element includes three or more notches in the flat plate-shaped conductor plate extending from an outer periphery of the flat plate-shaped conductor plate to inside and defining the three or more first element-side antenna portions.

2. The antenna apparatus according to claim 1, wherein:
the plate-like portion of the second element is provided at an interval from the first element,
the second element further includes three or more connection portions each of which connects a first end of the each of the three or more second element-side antenna portions with the corresponding one of the three or more grounding portions of the first element,
the first end is located on a side opposite to a second end, on a side of one of the three or more power feeding paths, of the each of the three or more second element-side antenna portions, and
the one of the three or more power feeding paths corresponds to the one of the three or more second element-side antenna portions.

3. The antenna apparatus according to claim 2, wherein:
each of the three or more connection portions is provided vertical to the one of the three or more second element-side antenna portions, and
a sum of lengths of one of the three or more second element-side antenna portions and a corresponding one of the three or more connection portions is n times a fourth of a wavelength of a radio wave that the antenna apparatus emits, n being one or more.

4. The antenna apparatus according to claim 1, wherein:
each of the three or more first element-side antenna portions includes a first end and a second end, the first end corresponding to a corresponding one of the three or more grounding portions of the first element, the second end being a free end.

5. The antenna apparatus according to claim 4, wherein
each of the three or more first element-side antenna portions includes a first portion and a second portion, the first portion including an outer edge of the first element, the second portion including the free end and extending from an end of the first portion toward a center of the first element.

6. The antenna apparatus according to claim 4, wherein
a length of each of the three or more first element-side antenna portions is a fourth of a wavelength of a radio wave that the antenna apparatus emits.

7. The antenna apparatus according to claim 1, wherein
an air layer or a dielectric layer is provided between the first element and the plate-like portion of the second element.

8. The antenna apparatus according to claim 1, wherein
the three or more power feeding paths are provided such that each angle formed by two adjacent power feeding paths among the three or more power feeding paths is identical.

9. The antenna apparatus according to claim 1, wherein
the plate-like portion of the second element has a contour having a shape identical to a shape of the first element.

10. The antenna apparatus according to claim 1, wherein:
each of three or more first element-side antenna portions is configured in a same shape, and
each of the three or more second element-side antenna portions is configured in a same shape.

11. The antenna apparatus according to claim 1, wherein
a number of the three or more first element-side antenna portions is equal to a number of the three or more second element-side antenna portions.

12. The antenna apparatus according to claim 1, wherein
the antenna apparatus emits a conical beam of circular polarization.

13. The antenna apparatus according to claim 1, wherein
the three or more notches separate the three or more first element-side antenna portions from each other, respectively.

14. The antenna apparatus according to claim 1, wherein
the three or more power feeding paths comprise four power feeding paths, and
the three or more second element-side antenna portions comprise four second element-side antenna portions.

* * * * *